Oct. 4, 1955     O. W. BONNAFE     2,719,761
BEARING STRUCTURE FOR SLIDING MACHINE CARRIAGE
Filed Oct. 28, 1952
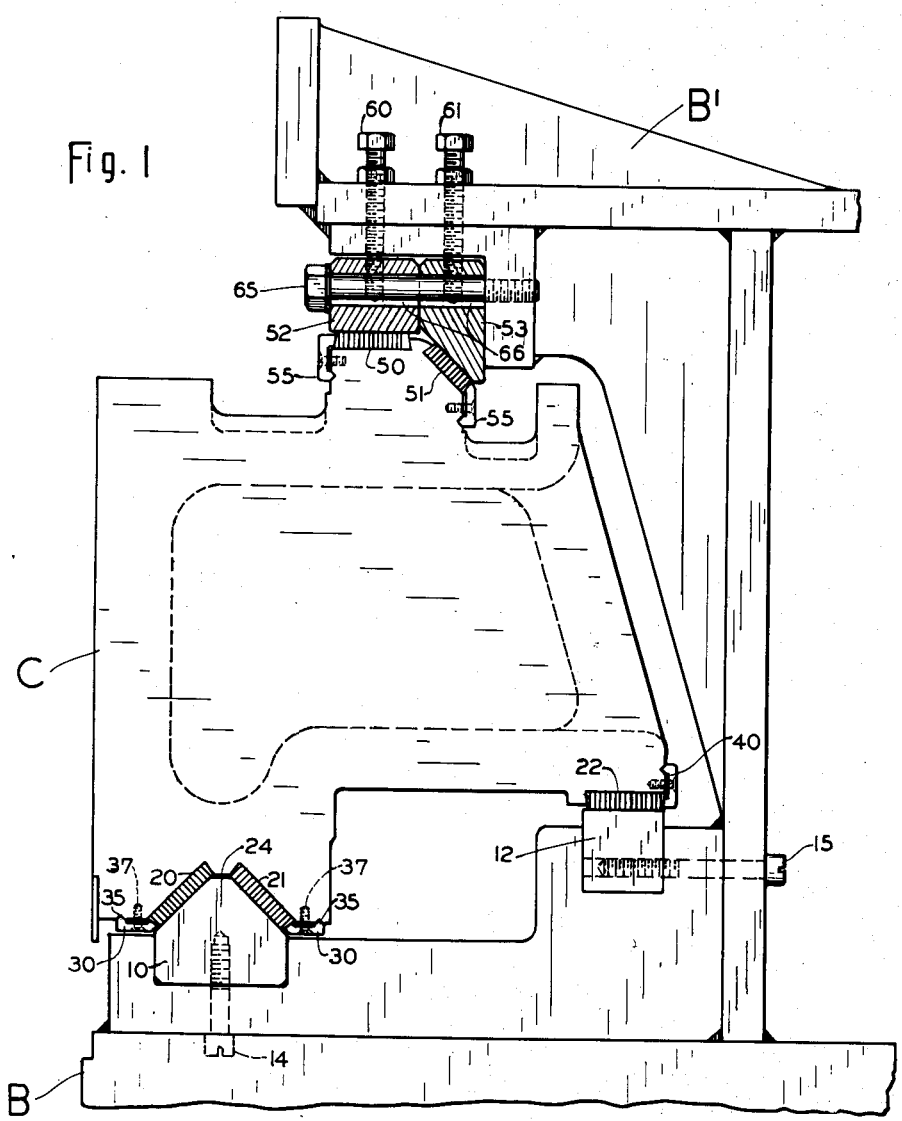
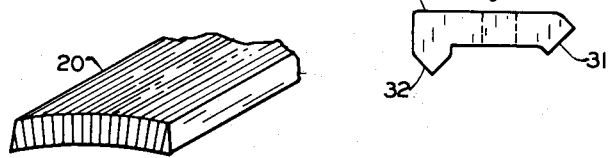
*INVENTOR.*
OLIVER W. BONNAFE.
BY
Chas. T. Hawley
ATT'Y.

United States Patent Office 2,719,761
Patented Oct. 4, 1955

2,719,761

BEARING STRUCTURE FOR SLIDING MACHINE CARRIAGE

Oliver W. Bonnafe, Hudson, Mass., assignor to The Lapointe Machine Tool Company, Hudson, Mass., a corporation of Maine Application October 28, 1952, Serial No. 317,209

1 Claim. (Cl. 308—3)

This invention relates to machines in which a relatively heavy carriage is mounted for sliding movement.

It is the general object of the invention to provide an improved bearing structure for such a sliding carriage.

More specifically, I provide the usual front and rear lower bearing members and I also provide supplementary bearing members to resist any upward thrust of the carriage and also to resist rearward angular carriage displacement about the lower rear bearing member. The invention also comprises an improved bearing block construction and improved securing devices therefor.

My invention further relates to arrangements and combinations of parts which will be hereinafter described and more particularly pointed out in the appended claim.

A preferred form of the invention is shown in the drawings, in which

Fig. 1 is an end view of a sliding machine carriage and its associated supporting structure, with certain parts shown in section;

Fig. 2 is a partial perspective view of a bearing block; and

Fig. 3 is a side view of a clamp to be described.

Referring to the drawings, I have shown a carriage C mounted on a base B having an overhanging upward extension B'.

The base B has a V-shaped front bearing member 10 and a flat rear bearing member 12 which are both of usual construction and which may be held in place by screws 14 and 15.

The carriage C has lower front bearing blocks 20 and 21 and a lower rear bearing block 22. A rib 24 extends between the adjacent edges of the blocks 20 and 21, and the sides of the rib are slightly undercut as shown.

A portion on one of the bearing blocks, as 20, is shown in Fig. 2. The blocks are preferably formed from a laminated plastic material and have slightly beveled longitudinal edges and are preferably slightly curved in section when unconfined.

Each block 20 or 21 is held in place by a series of clamps 30 (Fig. 3), each having a beveled end surface 31 and a V-shaped bearing rib 32. The carriage C has longitudinal grooves 35 to receive the ribs 32, and screws 37 are provided for tightening the clamps 30.

When pressure is applied to the beveled edge surfaces of a block 20 or 21 by tightening the clamps 30, the block will be straightened against the associated flat surface and will be firmly held in place.

Similar clamps 40 hold the bearing blocks 22 in place.

In the upper part of the carriage C, I provide supplementary bearing blocks 50 and 51, together with coacting bearing members 52 and 53. The blocks 50 and 51 are held in place by clamps 55 which are identical with the clamps used with the lower rear bearing blocks 22.

The bearing members 52 and 53 are positioned vertically by adjusting screws 60 and 61 and are secured by clamping screws 65 extending through slots 66 in said bearing members.

The bearing blocks 50 and bearing members 52 oppose any tendency of the carriage C to lift upward, and the inclined bearing blocks 51 and bearing members 53 prevent any angular or swinging movement of the carriage C about its lower rear bearing member 12.

A carriage thus provided with my supplemental bearing blocks and bearing members has been found exceptionally well adapted to carry unbalanced loads and to resist the pressure of heavy cuts.

Having thus described my invention and the advantages thereof, I do not wish to be limited to the details herein disclosed, otherwise than as set forth in the claim, but what I claim is:

A bearing structure for a sliding machine carriage which comprises a V-shaped front lower bearing and a flat rear lower bearing for said carriage, said carriage being of substantial height and having front and rear upper corner portions, and supplementary upper bearing members located above the upper rear corner portion of said carriage, one of said upper bearing members having a direct downwardly-facing surface engaging a substantially horizontal surface of said upper rear corner portion and the other upper bearing member having a rearwardly and downwardly inclined engaging surface engaging a correspondingly inclined surface of said upper rear portion, and said upper members thereby resisting rearward swinging movement of said carriage about its lower rear bearing, and said carriage having longitudinal bearing blocks with beveled edges and said bearing blocks being narrower at the outer and bearing surfaces, and said carriage having undercut recesses and clamping devices to receive and secure said bearing blocks, and said bearing blocks coacting with the lower bearings and upper bearing members of said bearing structure to slidably guide said carriage.

References Cited in the file of this patent

UNITED STATES PATENTS

| | | |
|---|---|---|
| 2,022,917 | Larkin et al. | Dec. 3, 1935 |
| 2,182,019 | Eisele | Dec. 5, 1939 |
| 2,479,653 | Walter | Aug. 23, 1949 |
| 2,525,712 | Neighbour | Oct. 10, 1950 |
| 2,593,230 | Walter | Apr. 15, 1952 |

FOREIGN PATENTS

| | | |
|---|---|---|
| 144,363 | Switzerland | Dec. 31, 1930 |
| 365,738 | Great Britain | Jan. 28, 1932 |